United States Patent
Love et al.

(10) Patent No.: US 6,977,936 B1
(45) Date of Patent: Dec. 20, 2005

(54) SERVICE DETAIL RECORDS FOR LAYERED COMMUNICATIONS PROTOCOLS

(75) Inventors: Simon Love, Edinburgh (GB); Brian Woodroffe, Edinburgh (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/549,336

(22) Filed: Apr. 14, 2000

(51) Int. Cl.[7] ............................. H04J 12/28; H04J 3/16
(52) U.S. Cl. .................. 370/395.5; 370/230; 370/466; 709/230
(58) Field of Search ........................ 370/395.5, 395.52, 370/401, 465, 466, 467, 469, 230, 236, 395.63; 709/224, 230

(56) References Cited

U.S. PATENT DOCUMENTS

| | | | | |
|---|---|---|---|---|
| 6,490,251 | B2 * | 12/2002 | Yin et al. | 370/236.1 |
| 6,532,211 | B1 * | 3/2003 | Rathonyi et al. | 370/230 |
| 6,651,099 | B1 * | 11/2003 | Dietz et al. | 709/224 |
| 6,665,725 | B1 * | 12/2003 | Dietz et al. | 709/230 |

* cited by examiner

*Primary Examiner*—Afsar Qureshi

(57) ABSTRACT

Service detail records (SDRs) are generated for at least two layers in a stack of protocols used in a communications network, where protocol data units (PDUs) for a lower-level protocol encapsulate PDUs for a higher-level protocol. SDRs for the higher-level protocol include pointers to SDRs for connections at the lower level which encapsulate PDUs from which the higher-level SDRs were generated.

17 Claims, 4 Drawing Sheets

SERVICE DETAIL RECORDS FOR LAYERED COMMUNICATIONS PROTOCOLS

TECHNICAL FIELD

This invention relates to service detail records (SDRS) for traffic carried in a communications network using two or more layered communications protocols, such as TCP/IP over ATM, and to methods and apparatus for generating such SDRs.

BACKGROUND ART

The continuing explosive growth in telecommunications traffic has led to the development of various techniques for providing users with telecommunications service and charging for it. In order to provide large increases in network capacity, technologies such as Asynchronous Transfer Mode (ATM) and their associated communications protocols are now being widely deployed. To provide flexibility and thus optimal use of this increased capacity, the telecommunications traffic carried over an ATM link may itself be coordinated and managed by the use in a layered manner of several additional protocols. For example, data for a World Wide Web page being transferred at the application level from a server to a client/user in accordance with the Hypertext Transfer Protocol (HTTP) may be embedded in packets managed in accordance with the Transmission Control Protocol and the Internet Protocol (TCP/IP). The packets in turn may be embedded in Point-to-Point Protocol (PPP) packets, which are themselves divided among ATM cells carried over the ATM transport layer.

Although this multiple layering or stacking of protocols provides great flexibility and facilitates the implementation of new techniques, it does pose additional challenges, for example in the generation of Service Detail Records. A Service Detail Record (SDR) is a record that summarizes the traffic carried on a monitored communications link (for example the identity of the nodes at each end of a TCP/IP connection, the duration of the connection and the total volume of data transferred over that connection). An SDR can be assembled for each of the layers in the communications stack.

Prior approaches to gathering statistics on the performance of various layers in a communications stack have included:

Using an MIB (Managed Information Base), in which summary performance statistics for various parameters (e.g. number of cells or number of errored cells) are kept as separate attributes of the MIB. Although an MIB can keep statistics on many levels in the communications stack, it cannot keep track of the relationships between the individual attributes. Thus it may keep track of the active virtual circuits (VCs) and of the IP connections, but it does not maintain any reference between the two.

Monitoring IP "flows": "netflow" records have been defined that provide summary statistics for each IP flow that is detected by an IP network device. Because these records are produced by devices that typically operate at layer 3 in the standard ISO seven-layer protocol model, they report solely on the IP level. They do not therefore provide any information relating to other layers in the protocol stack.

It is an object of this invention to provide a method and apparatus which facilitate the use of Service Detail Records in a system using layered protocols.

DISCLOSURE OF INVENTION

According to one aspect of this invention there is provided a set of at least two service detail records for traffic carried in a communications network, a first of said service detail records relating to protocol data units which conform to a first communications protocol and which are used to encapsulate protocol data units conforming to a second communications protocol, and a second of said service detail records relating to protocol data units which conform to said second communications protocol and containing an identification indicating a relationship to said first service detail record.

According to another aspect of this invention there is provided a method of monitoring traffic carried in a communications network, comprising the steps of:

examining traffic being carried in a communications network to detect protocol data units of a communications connection which conforms to a first communications protocol, said protocol data units encapsulating protocol data units conforming to a second communications protocol;

extracting said encapsulated protocol data units; and associating said extracted encapsulated protocol data units with an identification of said first communications connection;

whereby a service detail record for said encapsulated protocol data units can incorporate an identification of said first communications connection.

According to a further aspect of this invention there is provided apparatus for monitoring traffic carried in a communications network, comprising:

a probe for examining traffic being carried in a communications network to detect protocol data units of a communications connection which conforms to a first communications protocol, said protocol data units encapsulating protocol data units conforming to a second communications protocol;

an extractor for extracting said encapsulated protocol data units; and an associator for associating said extracted encapsulated protocol data units with an identification of said first communications connection;

whereby a service detail record for said encapsulated protocol data units can incorporate an identification of said first communications connection.

BRIEF DESCRIPTION OF DRAWINGS

A method and apparatus in accordance with this invention, for generating service detail records for traffic carried in a communications network, will now be described, by way of example, with reference to the accompanying drawings, in which.

BEST MODE FOR CARRYING OUT THE INVENTION, & INDUSTRIAL APPLICABILITY

Figure 1:
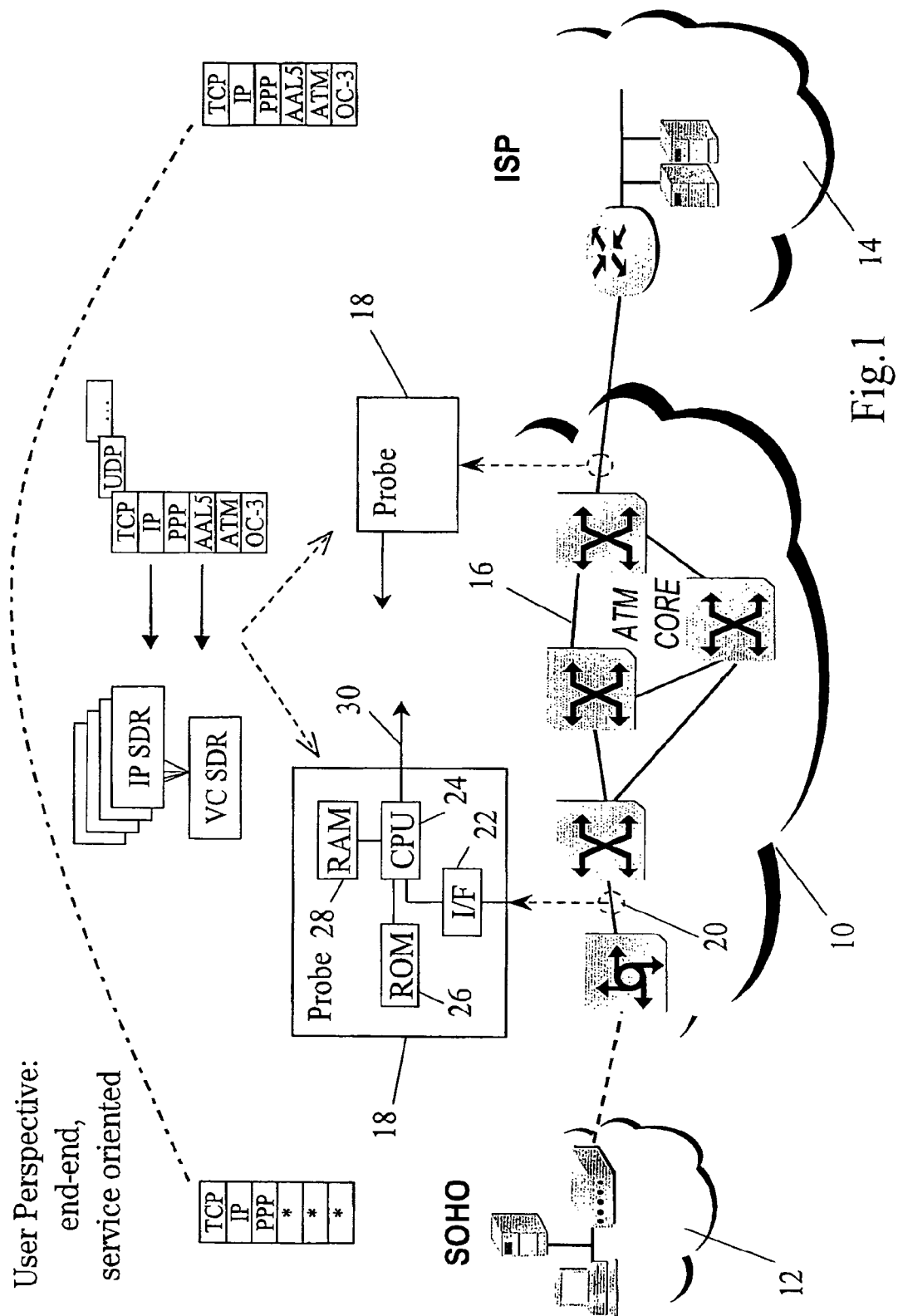
FIG. 1 is a schematic illustration of a communications network using several layered communications protocols, including a probe for passive monitoring of data packets or cells being transferred through the network.

Referring to FIG. 1, a communications network 10 using ATM technology provides communication of data signals between a user's small office/home office (SOHO) terminal equipment 12 and an internet service provider (ISP) 14. From the perspective of the user, an end-to-end service-oriented connection is provided. However, in practice this connection is the uppermost layer of a hierarchy of protocol layers, the lowermost layer of which comprises the physical link layer in which actual optical or electrical signals are transferred through the network 10 over links 16.

Typically each protocol layer defines a protocol data unit (PDU) comprising a header and a payload. The payload contains actual user data being transferred over the network. The header may identify, depending on the protocol, one or more of, for example:
- a communications connection to which the PDU belongs;
- a source of the payload data in the PDU (e.g. a sending station);
- a destination for the payload data in the PDU (e.g. a receiving station);
- the position of the PDU within a sequence of such PDUs belonging to the same communications connection.

When protocols are layered a complete PDU (header and payload) for one protocol layer is treated as the payload of a PDU for the next protocol lower down the stack of protocol layers (towards the physical layer). That lower protocol prefixes this composite payload with its own header to define a new PDU conforming to its own protocol requirements.

Thus, as shown in FIG. 1, PDUs are assembled in the user's terminal equipment 12, as TCP/IP packets. These packets are in turn encapsulated in a further set of protocol data units, conforming to PPP, and these further PDUs are transferred over a physical link (such as twisted pair cable) between the user's terminal equipment and the network 10. Within the network 10 the PPP protocol data units are encapsulated in ATM Adaptation Layer 5 (AAL5) PDUs which are then encapsulated in ATM cells for transmission over an OC-3 physical layer optical link 16 to the ISP 14.

As noted above, service detail records are generated in communications networks to facilitate network management functions such as billing and monitoring of service level provision. However, existing systems for generating such records are restricted to collection of data which relate strictly to a single layer in a hierarchy of protocol layers. Consequently an SDR produced by such a system from these data for the TCP/IP protocol layer, for example, would contain information solely about the TCP/IP layer, and an ATM SDR would likewise contain information about the ATM layer alone.

In accordance with the present invention, extraction of data for assembling SDRs is performed in such a manner that an SDR for one layer in a hierarchy of protocol layers includes a cross-reference to another SDR for a lower-layer protocol (closer to the physical layer) whose PDUs encapsulate PDUs for the higher-layer protocol.

In the exemplary implementation shown in FIG. 1, the extraction of data for generating SDRs is performed by distributed probes 18 which passively monitor the network links 16. The monitoring is passive in the sense that the operation of the links 16 is undisturbed by the presence of the probes 18, which simply make copies of some or all of the PDUs they observe traversing the links. The probes 18 are coupled to the links 16 via interfaces 20 in such a way that the operating characteristics of the links 16 are not altered. In the case of optical links, for example, the interfaces 20 may comprise optical power splitters; for electrical links they may be bridging isolators, or in the case of an Ethernet network LAN taps may be used.

Each probe 18 has an input interface 22 which receives and conditions the signal received from the optical power splitter interface 20 and supplies it to a CPU or processor 24 operating under the control of software program instructions in a program store 26. Before storing a PDU extracted from this signal in a random access store 28 the processor 24 may perform some initial processing, such as error checking, preliminary decoding, and identification of a specific communications connection to which the PDU belongs (e.g. for TCP/IP by using the IP addresses and port numbers of the end-points identified in the PDU header). The stored PDUs, or summary data derived from analysis of them performed by the processor 24, are subsequently forwarded via a communications link 30 (e.g. a local area network) to a control centre (not shown) for further analysis as necessary and for display of the results.

Figure 2:
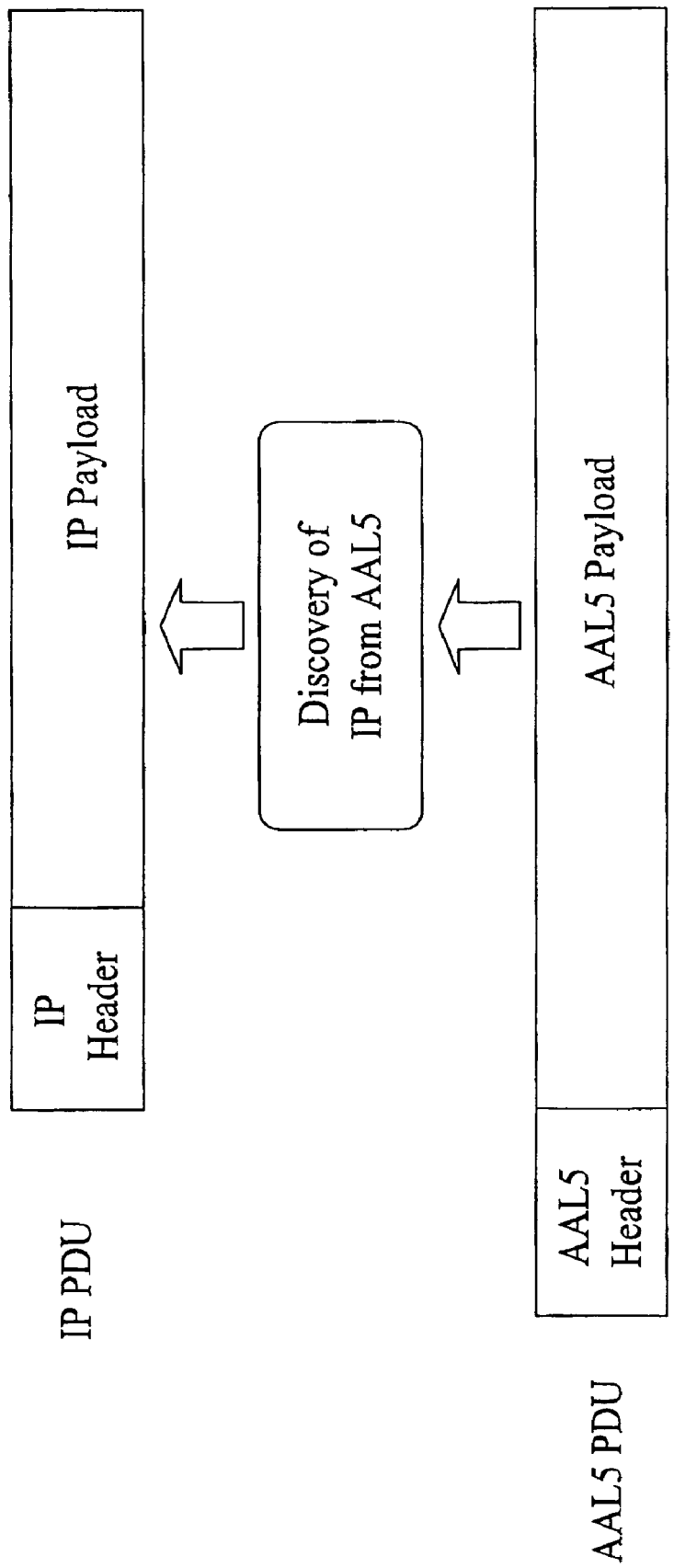
FIG. 2 illustrates the progressive extraction of protocol data units (PDUs) encapsulated within PDUs for lower-level protocols.
Figure 3:
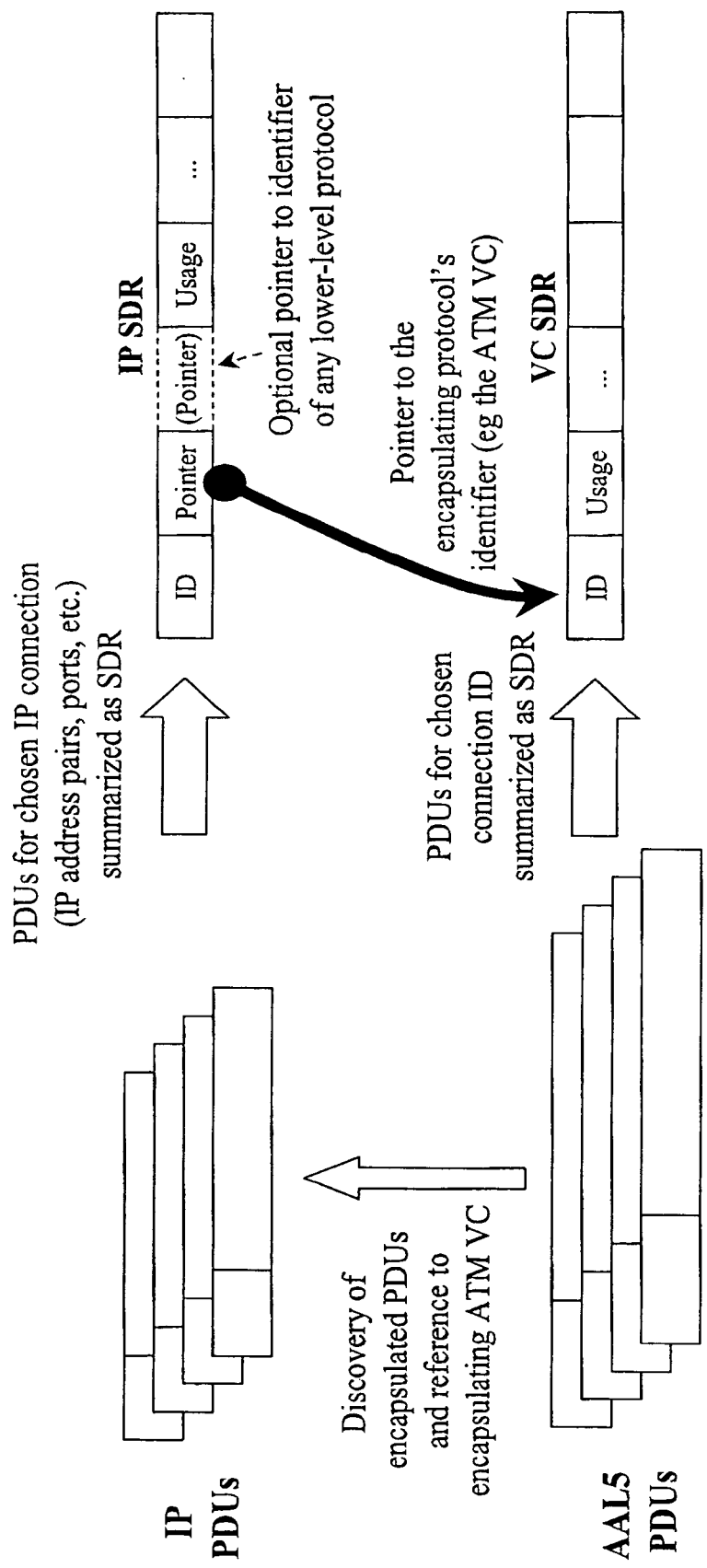
FIG. 3 illustrates the assembly of service detail records from extracted PDUs.

FIGS. 2 and 3 illustrate, by way of example, the extraction of an AAL5 PDU and of a TCP/IP PDU encapsulated within it, and the use of these PDUs to assemble respective SDRs.

Referring to these Figures, an AAL5 PDU comprises an AAL5 header and an AAL5 payload. The AAL5 header incorporates a variety of information in accordance with the ATM AAL5 protocol, including in particular an ATM virtual circuit (VC) identifier, which identifies the circuit or connection to which the payload of that PDU belongs. This identifier is extracted and checked to determine whether the VC to which it relates is one for which an SDR is required (typically only a selection of connections are monitored at a particular time). If an SDR for this VC is required, then the relevant data in the AAL5 PDU header are used to start or augment the SDR; these data typically include the identity of the VC and the total count of PDUs so far encountered for that VC (as an indication of network usage).

The AAL5 payload is also extracted, and a similar procedure is implemented, but now in the context of the TCP/IP protocol. Thus the AAL5 payload is now treated as a TCP/IP PDU, and its header is examined to extract a connection ID (defined in terms of, for example, the pair of IP addresses of the source and destination of the TCP/IP payload, and the source and destination port numbers for the connection). This connection ID is checked to determine whether an SDR is required, and if so the data in the TCP/IP header are used to start or augment the TCP/IP SDR.

As shown in FIG. 3, the data included in the TCP/IP SDR include in particular, in addition to the connection ID and usage data, a pointer to the ATM VC identifier for the ATM connection which encapsulated the TCP/IP data. If two or more protocol layers exist below an upper layer (TCP/IP in this case), then the SDR for the protocol at that upper layer may include pointers to connection IDs in SDRs for each of the lower layers. Alternatively pointers to SDRs for one or more of those lower layer protocols may be omitted, with pointers and SDRs being provided for some layers only. The layers for which pointers are provided may be at any level in the protocol stack.

Figure 4:
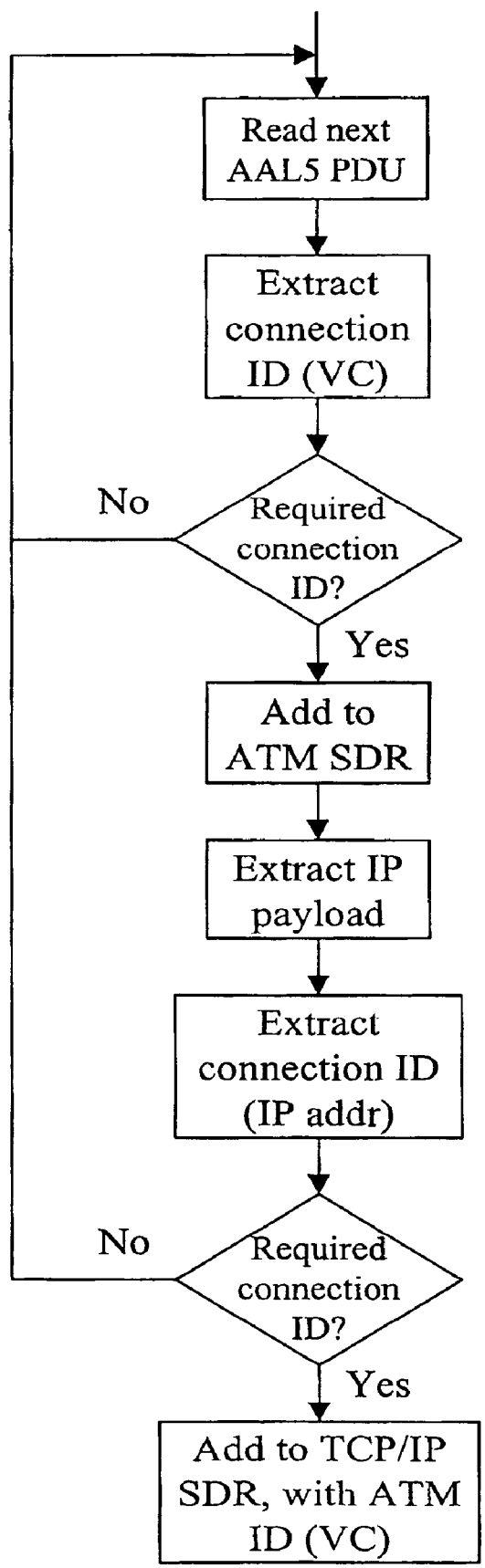
FIG. 4 is a flow chart of a procedure for assembling SDRs.

FIG. 4 shows the flow chart of a procedure for implementing the invention.

The provision of pointers to IDs of SDRs of encapsulating protocols in this way enables several advantageous features to be provided. Thus, it becomes possible to trace down the communications stack from any chosen level and relate behaviour at one level to causes or indicators at another. For example a causal association can be made between a high rate of TCP retransmissions and a high incidence of traffic enabled for cell-loss priority 1 (CLP1) on an encapsulating ATM VC. Additionally, quality of service (QoS) measurements that are made at one level in the communications stack can be used to augment usage statistics collected from another level.

What is claimed is:

1. A method of monitoring traffic carried in a communications network, comprising the steps of:
   examining traffic being carried in a communications network to detect protocol data units of a communications connection which conforms to a first communications protocol, said protocol data units encapsulating protocol data units conforming to a second communications protocol;
   extracting said encapsulated protocol data units; and
   associating said extracted encapsulated protocol data units with an identification of said communications connection; and
   creating a service detail record for said encapsulated protocol data units that incorporates an identification of said communications connections.

2. The method of claim 1, wherein the first communications protocol is asynchronous transfer mode and the second communications protocol is TCP/IP.

3. The method of claim 1, wherein the first and second communications protocols are directly adjacent to one another in a protocol stack.

4. A method of monitoring traffic carried in a communications network, comprising the steps of:
   examining traffic being carried in a communications network to detect protocol data units of a communications connection which conforms to a first communications protocol, said protocol data units encapsulating protocol data units conforming to a second communications protocol;
   extracting said encapsulated protocol data units;
   associating said extracted encapsulated protocol data units with an identification of said communications connection;
   whereby a service detail record for said encapsulated protocol data units can incorporate an identification of said communications connection; and
   assembling a first service detail record which relates to protocol data units conforming to the first communications protocol, assembling a second service detail record which relates to protocol data units conforming to the second communications protocol and incorporating in the second service detail record an identification indicating a relationship to said first detail record.

5. Apparatus for monitoring traffic carried in a communications network comprising:
   a probe for examining traffic being carried in a communications network to detect protocol data units of a communications connection which conform to a first communications protocol, said protocol data units encapsulating protocol data units conforming to a second communications protocol;
   an extractor for extracting said encapsulated protocol data units;
   an associator for associating said extracted encapsulated protocol data units with an identification of said communications connection, and
   a generator of a service detail record for said encapsulated protocol data units, the generated service detail record including an identification of said connection.

6. The apparatus of claim 5, wherein the first communications protocol is asynchronous transfer mode and the second communications protocol is TCP/IP.

7. The apparatus of claim 5, wherein the first and second communications protocols are directly adjacent to one another in a protocol stack.

8. A method of creating a set of at least two service detail records for network traffic comprising creating a first of said service detail records relating to protocol data units which conform to a first communications protocol and which encapsulate protocol data units conforming to a second communications protocol, and creating a second of said service detail records relating to protocol data units which conform to said second communications protocol and including an identification indicating a relationship to said first service detail record.

9. The method of claim 8, wherein the identification included in the second service detail record comprises an identification of a connection with which the protocol data units conforming to the first communications protocol are associated.

10. The method of claim 8, wherein the first communications protocol is asynchronous transfer mode and the second communications protocol is TCP/IP.

11. The method of claim 8, wherein the first and second communications protocols are directly adjacent to one another in a protocol stack.

12. A processor arrangement for performing the steps of claim 8.

13. A method of monitoring traffic including protocol data units of a connection conforming to a first communications protocol, said protocol data units encapsulating protocol data units conforming to a second communications protocol, the method comprising: (a) detecting the protocol data units which conform to a first communications protocol, (b) extracting said encapsulated protocol data units, (c) associating said extracted encapsulated protocol data units with an identification of said connection, and (d) creating a service detail record for said encapsulated protocol data units, the created service detail including an identification of said connection.

14. The method of claim 13, including the step of assembling a first service detail record which relates to protocol data units conforming to the first communications protocol, assembling a second service detail record which relates to protocol data units conforming to the second communications protocol, and including in the second service detail record an identification indicating a relationship to said first detail record.

15. The method of claim 13, wherein the first communications protocol is asynchronous transfer mode and the second communications protocol is TCP/IP.

16. The method of claim 13, wherein the first and second communications protocols are directly adjacent to one another in a protocol stack.

17. A processor arrangement for performing the steps of claim 13.

* * * * *